(12) United States Patent
Raynaud et al.

(10) Patent No.: US 12,159,538 B2
(45) Date of Patent: Dec. 3, 2024

(54) AIRCRAFT COMPRISING A FLIGHT MANAGEMENT ARCHITECTURE

(71) Applicant: Airbus Operations (S.A.S.), Toulouse (FR)

(72) Inventors: Sylvain Raynaud, Toulouse (FR); Jean-Claude Mere, Toulouse (FR); Thomas Pastre, Toulouse (FR); Fabien Perrin, Toulouse (FR); Jean Guilhamet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 383 days.

(21) Appl. No.: 17/385,132

(22) Filed: Jul. 26, 2021

(65) Prior Publication Data
US 2022/0028285 A1 Jan. 27, 2022

(30) Foreign Application Priority Data
Jul. 27, 2020 (FR) ...................................... 2007870

(51) Int. Cl.
*G08G 5/00* (2006.01)
*B64D 43/00* (2006.01)
*G08G 5/02* (2006.01)

(52) U.S. Cl.
CPC ........... *G08G 5/0039* (2013.01); *B64D 43/00* (2013.01); *G08G 5/0021* (2013.01); *G08G 5/025* (2013.01)

(58) Field of Classification Search
CPC .... G08G 5/0039; G08G 5/0021; G08G 5/025; G08G 5/0056; B64D 43/00
See application file for complete search history.

(56) References Cited

U.S. PATENT DOCUMENTS

| 7,499,771 B2 | 3/2009 | Caillaud |
| 8,108,086 B2 | 1/2012 | Bailly et al. |

(Continued)

FOREIGN PATENT DOCUMENTS

| DE | 196 54 864 A1 | 8/1997 |
| FR | 2 854 948 A1 | 11/2004 |

(Continued)

OTHER PUBLICATIONS

French Search Report for Application No. 2007870 dated Apr. 9, 2021.

(Continued)

*Primary Examiner* — Aniss Chad
*Assistant Examiner* — Chase L Cooley
(74) *Attorney, Agent, or Firm* — KDW Firm PLLC

(57) ABSTRACT

An aircraft with a unit to transmit information on ability/inability of pilots to fly the aircraft. Guidance avionics include guidance architecture and a flight controller to fly the aircraft. The guidance architecture has two dissimilar guidance chains and a selection unit connected thereto, to the flight controller and to the unit for measuring physical ability/inability, a first guidance chain to compute a main path for the aircraft towards a destination airport based on a current state of the aircraft by following a flight plan and to compute main guidance instructions for following the main path, a second guidance chain to compute an emergency path for the aircraft towards a diversion airport based on an initial portion of the common path with the main path and to compute emergency guidance instructions for following the emergency path. The selection unit receives the main and emergency guidance instructions and transmits either one to the flight controller.

6 Claims, 10 Drawing Sheets

(56) References Cited

U.S. PATENT DOCUMENTS

| | | | |
|---|---|---|---|
| 9,043,043 | B1 | 5/2015 | Gribble et al. |
| 10,473,485 | B2 | 11/2019 | Cantaloube |
| 2003/0209687 | A1 | 11/2003 | Iyengar |
| 2007/0050100 | A1* | 3/2007 | Gustafson ............ G05D 1/0061 701/4 |
| 2019/0090800 | A1* | 3/2019 | Bosworth ............ A61B 5/0015 |
| 2020/0369384 | A1* | 11/2020 | Kelly ................... G08G 5/0039 |

FOREIGN PATENT DOCUMENTS

| | | |
|---|---|---|
| FR | 2 917 221 A1 | 12/2008 |
| FR | 3 061 344 A1 | 6/2018 |
| JP | S 63278307 A | 11/1988 |
| JP | H 0927414 A | 1/1997 |
| JP | H 11506875 A | 6/1999 |
| JP | 2006505957 A | 2/2000 |
| JP | 2001508939 A | 7/2001 |

OTHER PUBLICATIONS

Lambrick,D.B et al, "The Preparation of CO/FE Alloy Fine Particles from the HFECO3 (CO)12," IEEE Transactions on Magnetics, IEEE Service Center, New York, NY, US, vol. 24, No. 2, Mar. 1, 1998, pp. 1644-1646.

Japanese Office Action for Application No. 2018545156 dated Jun. 22, 2021.

European Office Action for Application No. 17712276 dated Jul. 13, 2021.

* cited by examiner

AIRCRAFT COMPRISING A FLIGHT MANAGEMENT ARCHITECTURE

CROSS-REFERENCE TO RELATED APPLICATION

This application claims priority to French patent application number 20 07870 filed on Jul. 27, 2020, the entire disclosure of which is incorporated by reference herein.

TECHNICAL HELD

The disclosure herein relates to an aircraft comprising a flight management architecture and to a method for guiding an aircraft by the flight management architecture.

BACKGROUND

Conventionally, a flight management architecture comprises a guidance chain made up of several Flight Management Systems (FMS) for managing the flight plan, for computing the path of the aircraft, for following the flight plan by taking into account a given metric (time, distance, fuel consumption, etc.) and the current state of the aircraft (position, altitude, heading, attitude, angle of climb, etc.), and for transmitting guidance instructions to the flight controller in order to control the aircraft control surfaces according to the path to be followed.

In the event that the pilots are unable to fly the aircraft, it is desirable for the aircraft to be able to be autonomously directed towards a diversion airport by following the guidance instructions of the guidance chain, and to land at the diversion airport using autonomous landing.

In order to compute the flight path, each flight management system integrates the flight mechanics equations adapted to the flight conditions of the aircraft, as well as the constraints stipulated by the various flight procedures (approaches, etc.). In rare cases, for example, during complex approach procedures requiring a series of maneuvers, the flight management system produces anomalies, such as paths that are unsuitable for the situation or are erroneous due to the complexity of the computations implemented to ensure that maneuvers are combined, while taking into account the current state of the aircraft.

These anomalies are not problematic when the pilots are able to fly the aircraft, since the pilots can identify and resolve the anomaly while keeping the aircraft in safe flight conditions. In the event that the pilots would be unable to fly the aircraft, these anomalies do not ensure the reliability of the autonomous guidance of the aircraft towards a diversion airport.

Therefore, a requirement exists for overcoming this problem and for finding a flight management structure for an aircraft that ensures the availability and the integrity of the guidance of the aircraft with respect to possible software anomalies.

SUMMARY

An aim of the disclosure herein is to address all or some of this requirement and it relates to an aircraft comprising a cockpit with display screens and controls that can be activated by a pilot, a communication device or devices for communicating with a ground-based operator, a unit for measuring physical ability/inability configured to determine whether the crew is able or unable to fly the aircraft and to transmit a signal comprising information relating to the ability/inability of the pilots to fly the aircraft, the aircraft further comprising guidance avionics comprising a guidance architecture configured to compute guidance instructions for the aircraft and a flight controller that can be activated/deactivated via an action of the pilot on the controls and is configured to fly the aircraft according to the guidance instructions, the guidance architecture comprising two dissimilar guidance chains and a selection unit connected to the two guidance chains, to the flight controller, to the controls, to the display screens and to the unit for measuring physical ability/inability for receiving the signal transmitted by the unit, a first guidance chain, called main guidance chain, being configured to compute a main path for the aircraft towards a destination airport based on a current state of the aircraft and on a flight plan and to compute main guidance instructions for the aircraft for following the main path, a second guidance chain, called emergency guidance chain, being configured to compute an emergency path for the aircraft towards a diversion airport based on at least one part of an initial portion of the common path with the main path and on the current state of the aircraft and to compute emergency guidance instructions for the aircraft for following the emergency path, the selection unit being configured to receive the main and emergency guidance instructions and to transmit either of the guidance instructions to the flight controller as a function of the information relating to the ability/inability of the pilots to fly the aircraft.

The guidance architecture according to the disclosure herein allows, if the crew is unable to fly the aircraft, the aircraft to be directed to an emergency path towards a diversion airport, while ensuring the availability and the integrity of the guidance of the aircraft A on the emergency path, since the software implemented by the emergency guidance chain is reliable with respect to anomalies. The implementation of autonomous landing, which does not form part of the disclosure herein, will allow the aircraft A to land at the diversion airport.

Advantageously, the selection unit is configured to transmit the emergency guidance instructions to the flight controller upon receipt of a signal comprising information relating to the inability of the pilots to fly the aircraft.

Advantageously, the selection unit is configured to transmit the emergency guidance instructions to the flight controller upon receipt of a signal transmitted by the main guidance chain and indicating that the main guidance chain is faulty.

The disclosure herein also relates to a method for guiding an aircraft comprising a cockpit with display screens and controls that can be activated by a pilot, a communication device(s) for communicating with a ground-based operator, a unit for measuring physical ability/inability configured to determine whether the crew is able or unable to fly the aircraft and to transmit a signal comprising information relating to the ability/inability of the pilots to fly the aircraft, the aircraft further comprising guidance avionics comprising a guidance architecture configured to compute guidance instructions for the aircraft and a flight controller that can be activated/deactivated via an action of the pilot on the controls and is configured to fly the aircraft according to the guidance instructions, the guidance architecture comprising two dissimilar guidance chains and a selection unit connected to the two guidance chains, to the flight controller, to the controls, to the display screens and to the unit for measuring physical ability/inability for receiving the signal transmitted by the unit, the method comprising a step of computing a main path, in which a first guidance chain, called main guidance chain, computes a main path for the aircraft towards a destination airport based on a current state of the aircraft and on a first flight plan; a step of computing main guidance instructions, in which the main guidance chain computes main guidance instructions based on the main path; a step of computing the emergency path, in which a second guidance chain, called emergency guidance chain, computes an emergency path for the aircraft towards a diversion airport based on at least one part of an initial portion of a common path with the main path and on the current state of the aircraft; a step of computing emergency guidance instructions, in which the emergency guidance chain computes emergency guidance instructions for the aircraft based on an emergency path computed during a step of computing the emergency path; a transmission step, implemented by the selection unit, during which the selection unit either transmits the main guidance instructions to the flight controller if the signal transmitted by the unit for measuring physical ability/inability comprises information relating to the ability of the pilots to fly the aircraft or transmits the emergency guidance instructions to the flight controller if the signal comprises information relating to the inability of the pilots to fly the aircraft and activates the flight controller if the controller is deactivated.

Advantageously, in the step of computing the main path, the main guidance chain computes the main path by integrating the flight mechanics equations.

Advantageously, in the step of computing the emergency path, the main guidance chain computes the emergency path using only predefined segments and/or arcs of circles.

Advantageously, the pilot can act on the selection unit via the controls in order to force the selection unit to transmit the main guidance instructions to the flight controller in the event that the selection unit transmits emergency guidance instructions to the flight controller.

Advantageously, a ground-based operator can act on the selection unit, via the communication device(s) of the aircraft, in order to force the selection unit to transmit the main guidance instructions to the flight controller in the event that the selection unit transmits emergency guidance instructions to the flight controller, and to provide the main guidance chain with a second flight plan while replacing the first flight plan.

Advantageously, the selection unit transmits the emergency guidance instructions to the flight controller upon receipt of a signal transmitted by the main guidance chain and indicating that the main guidance chain is faulty, and activates the flight controller if the controller is deactivated.

Advantageously, in a warning step implemented by the emergency guidance chain following the step of computing the emergency path in the event that the emergency guidance chain has computed an emergency path only on one part of the initial portion of the common path, the emergency guidance chain sends a signal to a screen of the cockpit in order to display a warning message intended for a pilot asking them to act on the controls within a predetermined time, and, only if the pilot has not reacted during the predetermined time, in a step of transmitting guidance instructions, the selection unit transmits the emergency guidance instructions from the emergency guidance chain to the flight controller and activates the flight controller if the controller is deactivated.

BRIEF DESCRIPTION OF THE DRAWINGS

The aforementioned features of the disclosure herein, as well as other features, will become more clearly apparent from reading the following description of an embodiment, the description being provided with reference to the accompanying drawings, in which.

DETAILED DESCRIPTION

Figure 1:
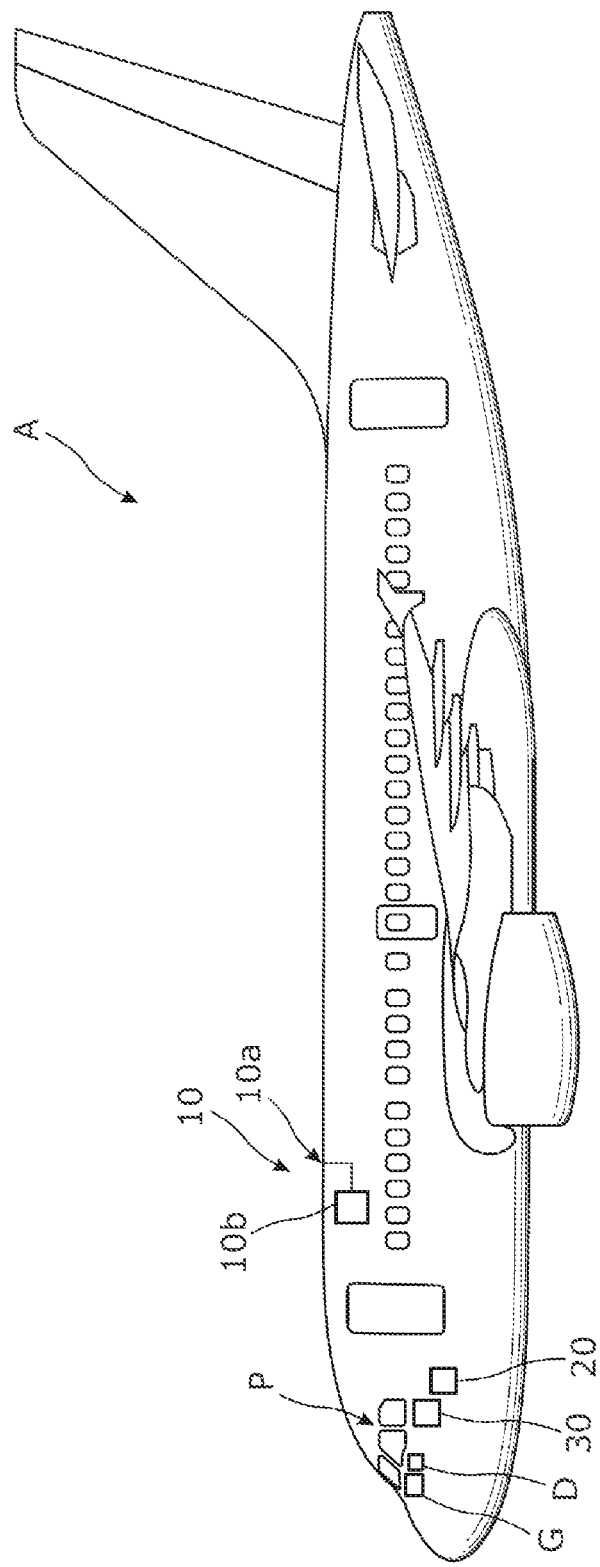
FIG. 1 is a lateral schematic representation of an aircraft comprising a guidance architecture according to one embodiment of the disclosure herein.
Figure 2:
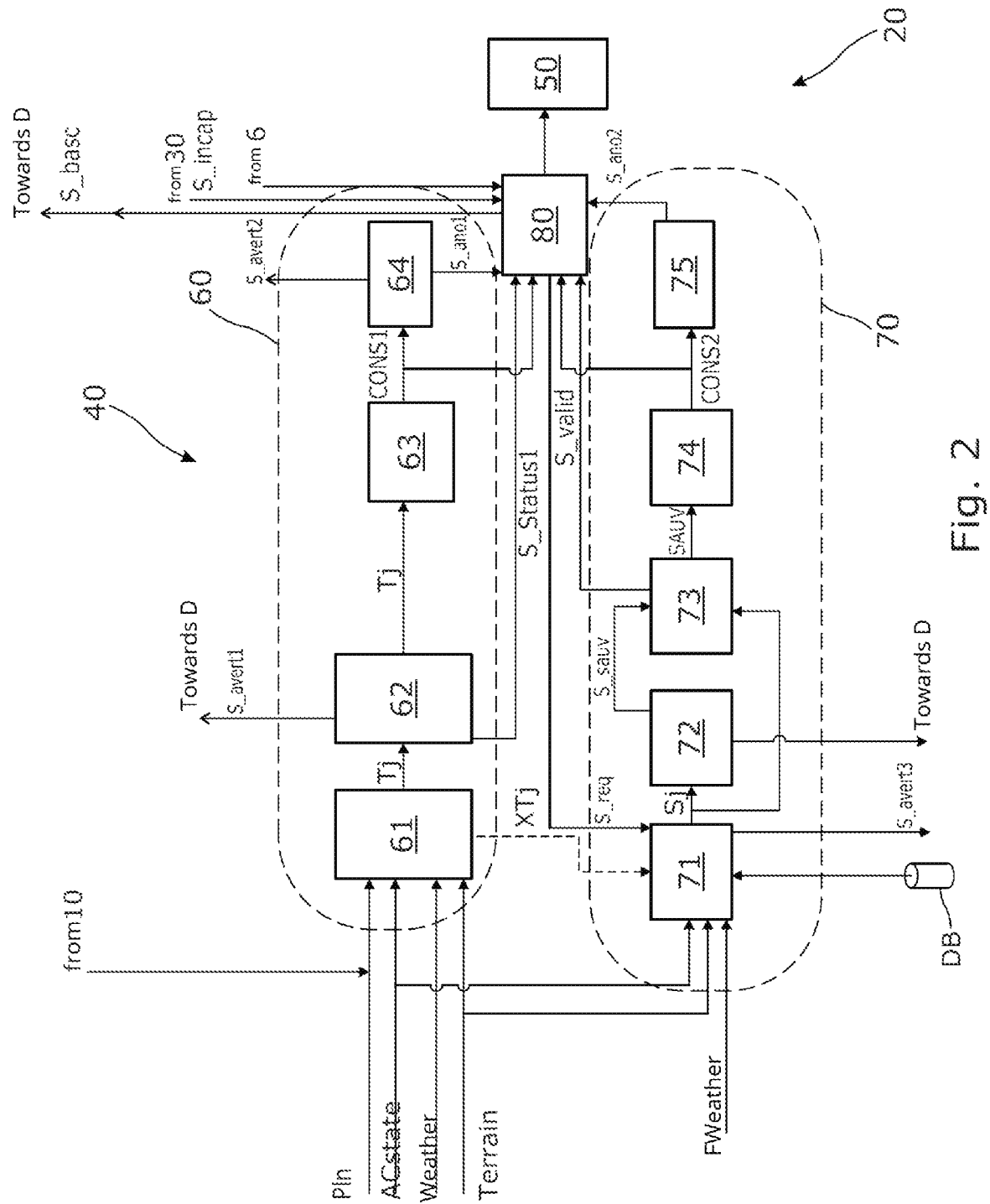
FIG. 2 is a schematic view of the guidance architecture connected to a flight controller, according to one embodiment of the disclosure herein.
Figure 3:
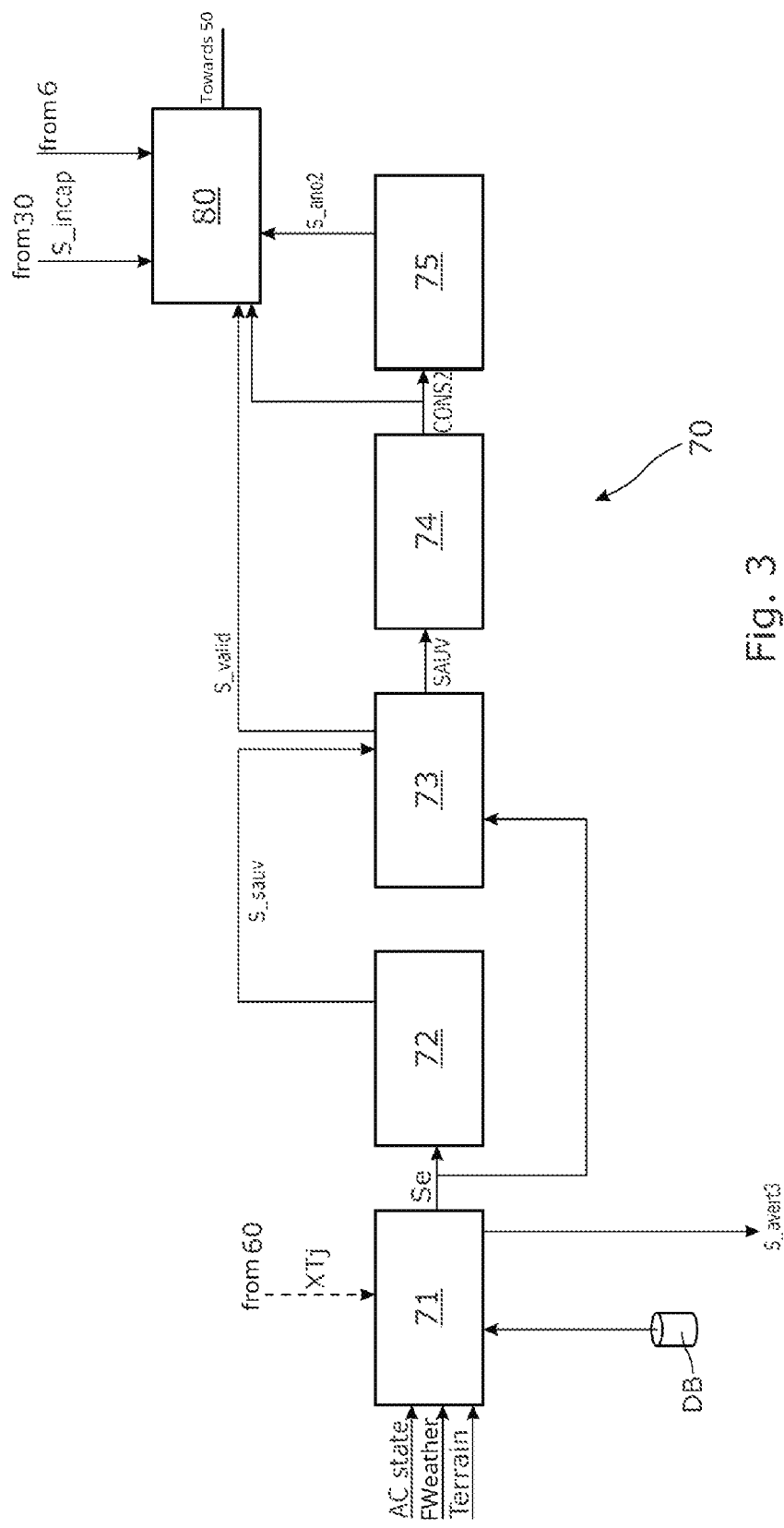
FIG. 3 is a schematic view of the emergency guidance chain connected to a unit for selecting the guidance architecture of FIG. 2 and of the interactions between the various elements of the chain for a particular guidance case.

With reference to FIGS. 1 through 3, an aircraft A is equipped with a plurality of systems and comprises a cockpit P for a crew. The cockpit P comprises controls G allowing a pilot to act on the flight of the aircraft A or on systems of the aircraft A, and a plurality of display screens D for displaying, for the attention of the crew, information originating from the various systems of the aircraft. The aircraft systems include:

A communication device(s) or electronics of the aircraft A, comprising one or more antenna(e) 10a connected to transmitters/receivers 10b, allowing communication with a ground-based operator;

guidance avionics 20, which allow automatic activation of the control surfaces of the aircraft A for following a flight plan Pln prepared before the flight (by the pilots, or received from a ground-based operator via the communication device(s));

a unit 30 for measuring physical ability/inability, which monitors the physical parameters of the pilots in order to detect whether or not the crew is able to fly the aircraft A.

The unit 30 for measuring physical ability/inability comprises one or more sensors (not shown), for example, of the camera type, for measuring the movements of the pilots, or heart rate sensors arranged in a bracelet worn by the pilots, and a central unit for interpreting, based on logic or thresholds that are pre-set and are recorded in a database, the results of the one or more sensors and for determining whether the crew is able, or, on the contrary, unable, to fly the aircraft as a function of the data from the sensors. The unit 30 for measuring physical ability/inability generates a signal S_incap indicating the state of ability/inability of the crew to fly the aircraft A, i.e. the signal comprises information relating to the ability, or, on the contrary, the inability, of the pilots to fly the aircraft A.

The guidance avionics 20, more specifically shown in FIG. 2, comprise:
- a guidance architecture 40 for computing a path of the aircraft A allowing the aircraft to follow the flight plan Pln and to compute guidance instructions associated with the path; and
- a flight controller 50, which receives the guidance instructions from the guidance architecture 40 in order to act on the control surfaces of the aircraft A in order to follow the computed path.

The flight controller 50 is a device that is currently used on aircraft and that can, via an action on the controls G, be activated in order to autonomously fly the aircraft A, or can be deactivated if a pilot wishes to fly the aircraft A manually.

According to one embodiment of the disclosure herein, the guidance architecture 40 comprises two guidance chains 60, 70 designed to compute guidance instructions, and a unit 80 for selecting guidance chains.

Among the two guidance chains, a first guidance chain, called main guidance chain 60, implements software for computing main guidance instructions CONS1 for the aircraft A in order to follow a path for the aircraft along the flight plan Pln. A second guidance chain, called emergency guidance chain 70, implements software for computing emergency guidance instructions CONS2 for the aircraft A, in order to reach a diversion airport DIV ARP, the coordinates of which are included in a database DB.

The two guidance chains are dissimilar, i.e. the software implemented by the main guidance chain 60 differs from that implemented by the emergency guidance chain 70.

The selection unit 80 is of the central unit type with a processor, memories, in which data is recorded, as well as an operating system executed by the processor for managing a set of software partitions so that the selection unit 80 can implement specific functions, as well as physical interfaces with other systems of the aircraft A. The selection unit 80 is connected to the two guidance chains 60, 70, to the unit 30 for measuring physical ability/inability, to the controls G, to the display screens D and to the flight controller 50.

The selection unit 80 receives the guidance instructions CONS1, CONS2 supplied by the two guidance chains 60, 70 and only transmits the instructions from a single guidance unit to the flight controller 50.

In nominal conditions (crew able to fly and main guidance chain 60 operational), the selection unit 80 only transmits the main guidance instructions CONS1 from the main guidance unit 60 to the flight controller 50. If the flight controller has been activated or is activated, the aircraft will then be flown according to the main guidance instructions CONS1 of the main guidance unit 60.

In the other conditions (crew unable to fly, or main guidance chain 60 inoperative), the selection unit 80 transmits the emergency guidance instructions CONS2 from the emergency guidance chain 70 to the flight controller 50 and activates, if applicable, the flight controller 50, in order to implement the emergency guidance instructions CONS2.

The inability of the crew to fly the aircraft is understood to mean either the physical inability of the crew to fly the aircraft A, which in this case is determined by the unit 30 for measuring physical ability/inability, which sends a signal S_incap comprising the information indicating that the crew is unable to fly the aircraft, or the lack of a response from the crew (no action from a pilot on the controls G) despite a request to this end, as will be explained hereafter.

The main guidance chain 60, like the emergency guidance chain 70, comprises at least two flight management systems that are identical but are independent of each other, which operate at the same time as each other, with the same input data. Each flight management system is, for example, housed on several items of IMA hardware (Integrated Modular Avionics is an architecture that is mainly described in standard ARINC653). Hardware equipment comprises a processor, memory, in which data is recorded, as well as an operating system executed by the processor to manage a set of software partitions so that the relevant equipment can implement a specific function, physical interfaces with various devices of the aircraft or with other hardware equipment.

For each guidance chain 60, 70, all the flight management systems carry out computations with the same input data and the same signals from the selection unit 80. At any time, only the results of the computations carried out by a single flight management system, called active system, are used to guide the aircraft, whereas the results of the computations of the other flight management systems, called passive systems, are not used. The selection unit 80 can select, for each of the guidance chains 60, 70, which flight management system is the active system. In other words, the selection unit 80 selects either of the flight management systems of each of the guidance chains 60, 70.

On the main guidance chain 60, the flight management systems implement software that carries out logic functions and operations implementing the flight mechanics equations adapted to the flight conditions (terrain, weather, current state) of the aircraft A, as well as, should the situation arise, the constraints stipulated by the various flight procedures (approaches, etc.).

The main guidance chain 60 receives as input the flight plan Pln of the aircraft, the current state ACstate of the aircraft (position, altitude, heading, attitude, angle of climb, etc.) and data originating from various systems of the aircraft A: namely the weather data Weather (winds, presence of storm cells, hail, etc.) and the terrain data Terrain (relief).

Each of the flight management systems of the main chain 60 comprises, as explained above, several items of equipment each implementing a specific function, namely:
- a main path computation unit 61, for implementing a path computation function based on a flight plan Pln;
- a main path monitoring unit 62, for implementing a path monitoring function;
- a main guidance unit 63, for implementing a function for converting a path into guidance instructions for the flight controller 50; and
- a main guidance monitoring unit 64, for implementing a guidance instructions monitoring function.

The main path computation unit 61 computes a path starting from the current state of the aircraft A to the destination, following the flight plan Pln, which is formed by a series of segments, called legs, allowing a start point to be connected to an arrival point. Each leg defines at least one constraint (speed, altitude, etc.) that must be followed when the aircraft flies on this leg. The path computed by the main path computation unit 61 is called main path Tj. The computation of the main path Tj involves computing curvilinear transitions from one leg of the flight plan to the next. In order to carry out this computation, the main path computation unit 61 integrates the flight mechanics equations and takes into account the constraints associated with the leg, the current state of the aircraft, the weather data Weather, and the terrain data Terrain. The computation carried out by the main path computation unit 61 is even more complex when certain legs, called floating legs, do not have a fixed position in space and the transition from a floating leg to the following leg depends on the current state of the aircraft and on its performance.

The main path monitoring unit 62 is provided with the main path Tj. Furthermore, the emergency guidance chain 70 is provided with the X first minutes (flight time) of the main path Tj based on the current state of the aircraft A, as will be explained hereafter. By way of an example, the emergency guidance chain 70 receives as input the first five minutes of the main path Tj.

The main path monitoring unit 62 ensures that the main path Tj is valid, i.e. does not exhibit any discontinuity and/or conflict with the terrain (relief) or the weather (avoidance of storm cells, areas of high winds, etc.). Furthermore, the path monitoring unit 62 ensures, as a function of the performance of the aircraft (stored in a memory), that the aircraft A will be able to follow the main path (turning radii or rate of descent compatible with the performance of the aircraft A).

The main guidance unit 63 computes the differences between the current state of the aircraft A and the main path Tj. The main guidance unit converts these differences into guidance instructions in order to move the aircraft A to the main path Tj. The main guidance instructions CONS1 are sent to the selection unit 80 and to the main guidance monitoring unit 64.

The main guidance monitoring unit 64 verifies the validity of the main guidance instructions CONS1, i.e. their consistency with the current state of the aircraft A in relation to the main path Tj, while ensuring that the computed instruction will allow the aircraft to be effectively moved onto the main path Tj. A lack of validity in the guidance instructions indicates a software anomaly in the active flight management system.

The emergency guidance chain 70 receives as input the current state ACstate of the aircraft (position, altitude, heading, attitude, angle of climb, etc.) and data originating from various systems of the aircraft A: namely simplified weather data FWeather (presence of storm cells only) and the terrain data Terrain (relief). The flight management systems of the emergency guidance chain 70 have access to the database DB of the diversion airports, updated by a ground-based operator and transmitted to the aircraft A via the communication device(s) 10, for example, before the flight, in preparation for the flight. The database DB comprises, for each airport: the geographical position of the airport, autonomous landing solutions, such as the runways that can be used and, for these runways, the approach means, the simplified approach procedures.

Each flight management system of the emergency guidance chain 70 comprises, as explained above, several items of hardware equipment, each implementing a specific function, namely:
  an emergency path computation unit 71, for implementing a function for computing a path towards a diversion airport DIV ARPT;
  an emergency path monitoring unit 72, for implementing a path monitoring function;
  a backup unit 73, for implementing a path backup function and validating the backed-up path;
  an emergency guidance unit 74, for converting a path into guidance instructions for the flight controller 50;
  an emergency guidance monitoring unit 75, for implementing a guidance instructions monitoring function.

The emergency path computation unit 71 receives a portion of the main path corresponding to the X first minutes (Xtj in FIG. 2) of the main path Tj and is configured to compute a direct path, called emergency path Sj, Se, between at least one part of the common path portion XTj (based on the current state ACstate of the aircraft: the part of the common path portion always has the airplane as the origin) and the closest diversion airport DIV ARPT. The emergency path Sj, Se continues until the aircraft A stops on a runway of the selected diversion airport DIV ARPT (with the airport being selected by a selection module (not shown) with access to the database DB, according to a criterion of proximity with the position of the aircraft, or as a function of other information, such as the nature of the runways, the weather at the airport, the state of the aircraft (engine state, fuel level, etc.) and the runways preselected by the pilot).

The emergency path Sj, Se and the main path Tj consequently have a common initial part XTj allowing a smooth transition of the flight to be provided if the flight controller 50 uses the emergency guidance instructions CONS2 of the emergency guidance chain 70 instead of the main guidance instructions CONS1 of the main guidance chain 60.

The computation carried out by the emergency path computation unit 71 is not based on the flight plan Pln used by the main guidance chain 60 (even when the diversion airport is identical to that initially scheduled in the flight plan), which allows the computations, and therefore the software implemented by the flight management systems of the emergency guidance chain 70, to be significantly simplified. By contrast, the emergency path computation unit 71 computes the emergency path Sj, Se by seeking to proceed in a straight line towards the diversion airport DIV ARPT, while avoiding any obstacles (relief or storm cells) on the direct route, without integrating the flight mechanics equations. Thus, the emergency path computation unit 71 computes the emergency path Sj, Se using only straight geometrical segments and/or predefined arcs of circles to avoid any obstacles (relief or storm cells) on the direct route. The arcs of circles are computed in real time, but with conservative hypotheses (low curvature so that the airplane can fly on them even in degraded flight conditions, for example). The emergency path Sj, Se is only made up of straight geometrical segments and/or predefined arcs of circles.

The computation of the emergency path Sj, Se is repeated frequently, for example, every thirty seconds in the case whereby the common path portion XTj sent to the emergency path computation unit 71 is made up of the first five minutes of the main path Tj. The computation of the emergency path Sj, Se could be repeated more frequently, for example, every ten seconds.

For each iteration, the newly computed emergency path Sj, Se is transmitted to the emergency path monitoring unit 72, which ensures that the emergency path Sj, Se is valid. To this end, the emergency path monitoring unit 72 ensures:
  the consistency between the end of the emergency path Sj, Se and the approach of the targeted diversion airport DIV ARPT;
  that the emergency path Sj. Se can be flown by the aircraft as a function of its capabilities (in particular the fuel level) and performance (in particular the flight envelope);
  that the emergency path Sj, Se does not have any discontinuity;
  by computations for anticipating the position of the aircraft along the emergency path Sj, Se so that the aircraft does not risk encountering a storm cell or colliding with a relief.

The emergency path Sj, Se is invalid if it does not meet all these conditions.

If the emergency path monitoring unit 72 validates the emergency path Sj, Se, the path is stored in the backup unit 73 instead of the backup of the emergency path Sj, Se computed during a previous iteration.

The backup of the last validated emergency path Sj, Se enables guidance to be continued on the last valid emergency path Sj, Se if the computations allowing the diversion airport DIV ARPT to be reached fail several times at a given moment (in the event that the emergency guidance chain 70 no longer finds a solution). The path SAUV stored in the backup unit is updated in real time in order for it to be adapted to the evolution of the current state of the aircraft A.

The backup unit 73 is configured to ensure the validity of the stored emergency path SAUV, by ensuring:

the consistency between the end of the recorded path SAUV and the approach of the targeted diversion airport DIV ARPT;

that the recorded path SAUV can be flown by the aircraft as a function of its capabilities (in particular the fuel level) and performance (in particular the flight envelope) thereof;

that the recorded path SAUV does not have any discontinuity;

by computations for anticipating the position of the aircraft along the recorded path SAUV that the aircraft does not risk encountering a storm cell or colliding with a relief;

that the recorded path SAUV has not expired (i.e. was not stored more than X iterations ago, for example, with X being equal to 9 if the common path portion XTj is five minutes and the iterations of the emergency guidance chain are every thirty seconds).

The emergency guidance unit 74 receives the last path SAUV recorded in the backup unit 73 and computes the differences between the current position of the aircraft A and the path. The emergency guidance unit converts these differences into emergency guidance instructions CONS2 in order to move the airplane onto the path. The emergency guidance instructions CONS2 are sent to the selection unit 80 and to the emergency guidance monitoring unit 75.

The emergency guidance monitoring unit 75 verifies that the instructions provided are consistent with the current state of the aircraft A, i.e. that the instructions will allow the aircraft to be effectively moved onto the emergency path Sj, Se.

As an alternative embodiment (not shown in the figures), the flight management systems of the emergency guidance chain 70 do not include an emergency guidance monitoring unit 75 and the function fulfilled by this unit is implemented by a device (for example, the primary computer, called PRIM) outside the emergency guidance chain 70, and this is the case for all the flight management systems thereof.

Figure 4:
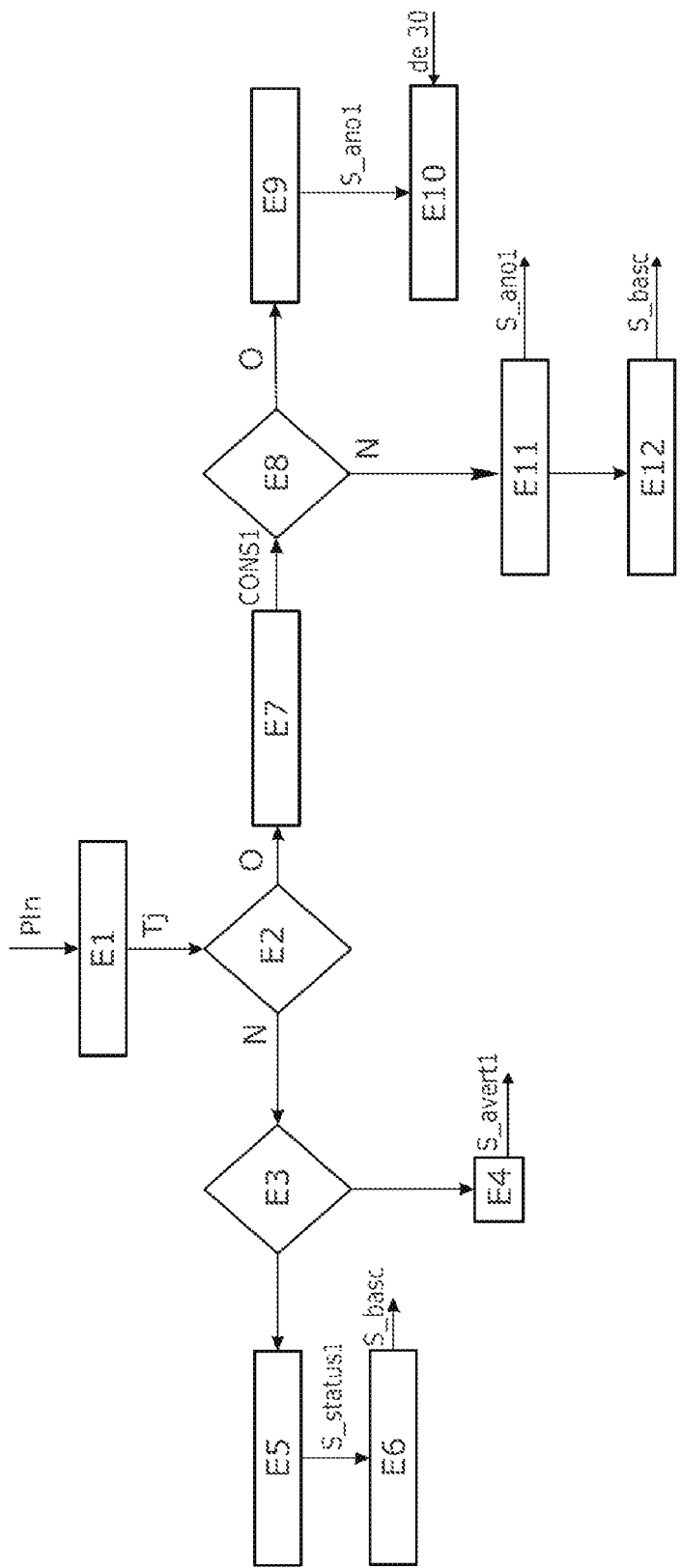
FIG. 4 is a view, in the form of a logic diagram, of the various steps implemented by the main guidance chain of the guidance architecture of FIG. 2.

The operation of the guidance architecture 40 will be described hereafter with reference to FIGS. 4 through 6.

On the main guidance chain 60 (FIG. 4), in a step E1 of computing the main path Tj implemented by the main path computation unit 61, the main path Tj is computed for following the flight plan Pln.

In a step E2 of validating the main path, the main path monitoring unit 62 ensures that the main path Tj is valid, as explained above.

In the event that the main path Tj is invalid, the implemented logic depends on the imminence and the nature of the identified problem. Indeed, in a determination step E3 following the step E2 of validating the main path, the main path monitoring unit 62 determines whether the main path Tj is:

a unflyable or exhibits a discontinuity or exhibits a conflict (terrain or weather) in the common path portion XTj;

a unflyable or exhibits a discontinuity or exhibits a conflict beyond the common path portion XTj.

A/ In the event that the main path Tj exhibits a conflict, or is unflyable or exhibits a discontinuity beyond the common path portion XTj, the guidance continues on the main path Tj and, in an information step E4, the main path monitoring unit 62 sends a signal S_avert1 to a display screen D of the cockpit P in order to display an information message for notifying the pilots of a long-term conflict ahead. Upon receipt of this message, the pilots can act on the controls G in order to anticipate and resolve the conflict.

B/ In the event that the main path Tj exhibits a conflict, or is unflyable or exhibits a discontinuity in the common path portion XTj, and in a warning step E5, the main path monitoring unit 62 sends a signal S_status1 to the selection unit 80. The signal S_status1 comprises information indicating that the main path Tj exhibits an anomaly in the common path portion XTj.

Upon receipt of this signal, and in a switching step E6, the selection unit 80 switches to another flight management system of the main guidance chain 60. The selection unit 80 sends a signal S_basc to a screen of the cockpit P for displaying an information message indicating that a flight management system has been switched to another flight management system.

If no main path Tj exhibiting a conflict, being flyable or not exhibiting any discontinuity in the common path portion XTj can be computed by the other one or more flight management system(s) of the main guidance chain 60 (which case is not shown), the main guidance chain 60 is then described as faulty/inoperative. The selection unit 80 that receives the signals S_status1 from all the flight management systems of the main guidance chain 60, considers that the main guidance chain 60 is faulty, when all the flight management systems of the chain have sent a signal S_status1 indicating that the main path Tj exhibits an anomaly in the common path portion XTj. Upon receipt of the signal S_status1 indicating that the main path Tj exhibits an anomaly in the common path portion XTj, transmitted by the last active flight management system (with the other flight management systems having already transmitted such a signal), the selection unit 80 switches directly to the emergency guidance chain 70 and activates the flight controller 50 if it has been deactivated. The selection unit 80 notifies the pilot of the switch to the emergency guidance chain by sending a signal (not shown) to a display screen D in order to display a warning message intended for the pilot notifying them that the main guidance chain is inoperative.

Upon reading the message, the pilot can attempt to reset the main guidance chain 60. With the emergency path Sj having at least one part shared with the old main path Tj, the aircraft does not immediately change path and the pilot has time to reload the old flight path and switch back to the main guidance chain 60 before the aircraft deviates from the old route. If, on the contrary, the pilot is incapacitated (not yet detected), the aircraft continues on the emergency path Sj.

In the event that the main path Tj is valid, in a step E7 of computing guidance instructions implemented by the main guidance unit 63 following the step E2 of validating the main path, the main guidance unit 63 receives the main path Tj and computes the main guidance instructions CONS1 that are sent to the selection unit 80 and to the main guidance monitoring unit 64.

In a step E8 of verifying guidance instructions, implemented by the main guidance monitoring unit 64, the unit verifies the validity of the main guidance instructions CONS1 of the aircraft A.

If the main guidance instructions CONS1 are valid, in a step E9 of transmitting main guidance instructions CONS1 implemented by the main guidance monitoring unit 64 following the step E8 of verifying guidance instructions, the main guidance monitoring unit 64 sends a signal S_anol to the selection unit 80 with information indicating that the instructions are valid.

In a transmission step E10 implemented by the selection unit 80 upon receipt of the signal S_anol indicating that the main guidance instructions CONS1 are valid, the unit transmits the main guidance instructions CONS1 from the main guidance chain 60 to the flight controller 50 if the pilot is not incapacitated (S_incap signal from the unit 30 for measuring physical ability/inability comprising information indicating that the pilots are able to fly). In the event that the pilot is incapacitated (S_incap signal from the unit 30 for measuring physical ability/inability comprising information indicating that the pilots are unable to fly), the selection unit 80 activates the flight controller 50 if the controller is not activated and transmits the emergency guidance instructions CONS2 from the emergency guidance chain 70 to the flight controller 50.

If the main guidance instructions CONS1 are invalid, in a warning step E11, the main guidance monitoring unit 64 sends a signal S_anol to the selection unit 80. The signal S_anol comprises information indicating that the main guidance instructions CONS1 are invalid.

Upon receipt of this signal, and in a switching step E12, the selection unit 80 switches to another flight management system of the main guidance chain 60. The selection unit 80 sends a signal S_basc to a screen of the cockpit P in order to display an information message indicating that the flight management system has switched to another system.

If no instruction not exhibiting an anomaly in the common path portion XTj can be computed by the other one or more flight management system(s) of the main guidance chain 60 (which case is not shown), the main guidance chain 60 is then described as faulty/inoperative. The selection unit 80 that receives the signals S_anol from all the flight management systems of the main guidance chain 60 considers that the main guidance chain 60 is faulty, when all the flight management systems of the chain have sent a signal S_anol indicating that the main guidance instructions CONS1 are invalid. Upon receipt of the signal S_anol indicating that the main guidance instructions CONS1 are invalid, which signal is transmitted by the last active flight management system (with the other flight management systems already having transmitted such a signal), the selection unit 80 switches directly to the emergency guidance chain 70 and activates the flight controller 50 if it has been deactivated. The selection unit 80 notifies the pilot of the switch to the emergency guidance chain by sending a signal (not shown) to a display screen D in order to display a warning message intended for the pilot indicating that the main guidance chain is faulty/inoperative.

Upon reading the message, the pilot can attempt to reset the main guidance chain 60. With the emergency path Sj having at least one part shared with the old main path Tj, the aircraft does not immediately change path and the pilot has time to reload the old flight path and switch back to the main guidance chain 60 before the aircraft deviates from the old route. If, on the contrary, the pilot is incapacitated (not yet detected), the aircraft continues on the emergency path Sj.

At the same time as the computations carried out by the main guidance chain 60, on the emergency guidance chain (FIGS. 5 and 6):

In a step E20 of computing the emergency path implemented by the emergency path computation unit 71, the unit computes the emergency path Sj based on the common path portion XTj for reaching the diversion airport DIV ARPT. This step is implemented for each new iteration.

Figure 5:
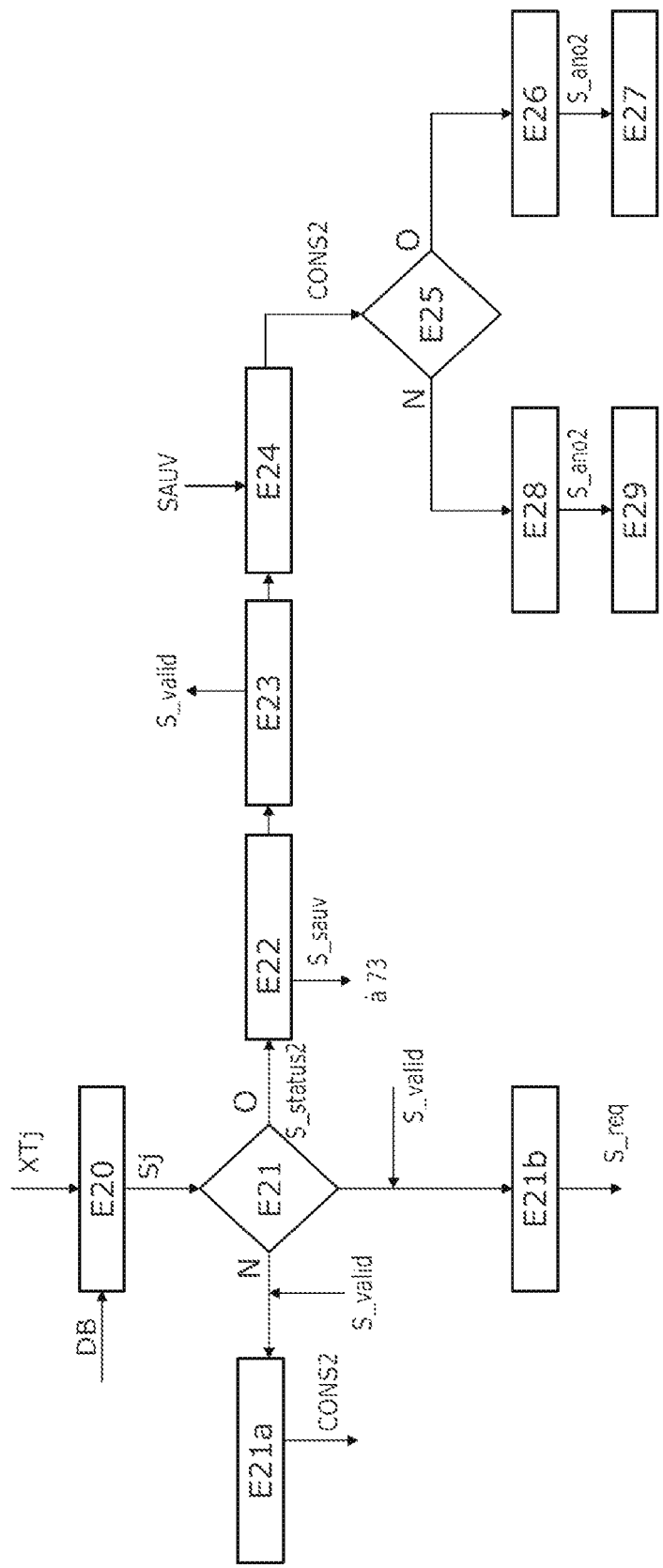
FIG. 5 is a view similar to FIG. 4, in the form of a logic diagram, of the various steps implemented by the emergency guidance chain of the guidance architecture of FIG. 2 in a first guidance case.

Three cases can be contemplated (FIGS. 5 and 6):

A/ With respect to FIG. 5, the case whereby the emergency path computation unit 71 is able to compute an emergency path Sj based on the entire common path portion XTj (no conflict or anomaly detected by the emergency path computation unit 71 in the common path portion XTj):

The emergency path Sj computed by the emergency path computation unit is transmitted to the emergency path monitoring unit 72. The unit, in a step E21 of validating the emergency path, verifies the validity of the emergency path computed by the emergency path computation unit 71.

In this case:

- in a recording step E22 following the step E21 of validating the emergency path Sj, the emergency path monitoring unit 72 sends a signal S_sauv to the backup unit 73 for the unit to record the newly computed emergency path Sj and to delete the recorded path SAUV computed during a previous iteration;
- in a verification step E23, continuously implemented until the recorded path SAUV is overwritten by another backup, the backup unit 73 verifies the validity of the backed-up path SAUV and sends a signal S_valid to the selection unit 80 for indicating the validity of the recorded path SAUV;
- in a step E24 of computing emergency guidance instructions implemented by the emergency guidance unit 74 following the verification step E23, the emergency guidance unit 74 receives the path SAUV recorded in the backup unit 73 and computes the emergency guidance instructions CONS2 in order to move the aircraft A onto the path. The emergency guidance instructions CONS2 are also sent to the selection unit 80;
- in a step E25 of verifying guidance instructions, implemented by the emergency guidance monitoring unit 75 following the step E24 of computing emergency guidance instructions, the emergency guidance monitoring unit 75 verifies the validity of the emergency guidance instructions CONS2, i.e. verifies whether the instructions CONS2 are consistent with the current state of the aircraft A in relation to the emergency path Sj.

If the emergency guidance instructions CONS2 are valid:

- in a step E26 of transmitting guidance instructions, implemented by the emergency guidance monitoring unit 75 following the step E25 of verifying guidance instructions, the emergency guidance monitoring unit 75 sends a signal S_ano2 to the selection unit 80. The signal S_ano2 comprises information indicating that the emergency guidance instructions CONS2 are valid, i.e. that they can be transmitted, in the event that the pilot is incapacitated or the primary guidance chain 60 is inoperative, to the flight controller 50;
- in a subsequent step E27 of using guidance instructions, implemented by the selection unit 80 upon receipt of the signal S_ano2 indicating that the emergency guidance instructions CONS2 are valid, the unit transmits, if the pilot is incapacitated (reception of the signal S_incap indicating that the crew is incapacitated) or if the primary guidance chain 60 is faulty/inoperative, the emergency guidance instructions CONS2 from the emergency guidance chain 70 to the flight controller 50 (after activation, if necessary, by the selection unit 80).

However, in the event that the emergency guidance instructions CONS2 are invalid:

in a warning step E28 implemented by the emergency guidance monitoring unit 75 following the step E25 of verifying guidance instructions, the unit sends a signal S_ano2 to the selection unit 80 with information indicating that the emergency guidance instructions CONS2 are invalid;

in a switching step E29 implemented by the selection unit 80 following the warning step E28, the selection unit 80, upon receipt of the signal S_ano2, considers that the emergency guidance instructions CONS2 of the flight management system that exhibits the anomaly are not valid and do not take into account the results of the active flight management system. The selection unit 80 uses the results, in particular the emergency guidance instructions CONS2, of another flight management system of the emergency guidance chain 70 that until now was passive.

In the event that the emergency path Sj is invalidated by the emergency path monitoring unit 72, due to the fact that the path has an anomaly or a conflict with the terrain or a storm cell:

if the signal S_valid sent by the backup unit 73 to the selection unit 80 indicates that the recorded path SAUV is valid and, in a transmission step E21a, the selection unit 80 accepts the emergency guidance instructions CONS2, which are the instructions computed in the current iteration based on the path SAUV stored during a previous iteration;

a if the signal S_valid sent by the backup unit 73 to the selection unit 80 indicates that the recorded path SAUV is invalid, in a request step E21b, the selection unit 80 does not accept the emergency guidance instructions CONS2 and sends a signal S_reg to the emergency path computation unit 71 for relaunching the computation of an emergency path with another diversion solution (for example: different diversion airport).

Figure 6:
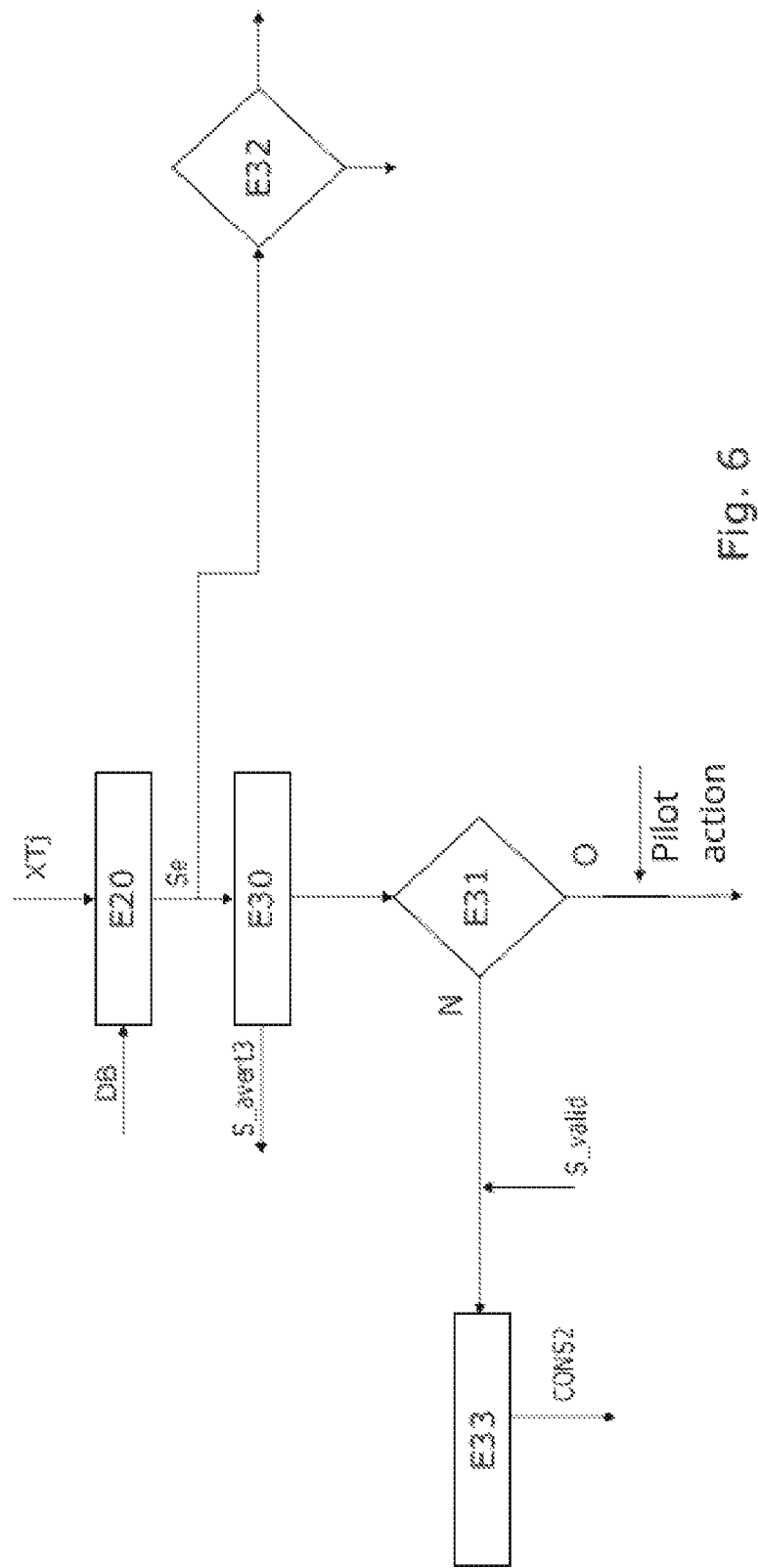
FIG. 6 is a view similar to FIG. 5, in the form of a logic diagram, of the various steps implemented by the emergency guidance chain shown in FIG. 3 in the particular case of guidance.

B/ FIGS. 3 and 6 show the case whereby the emergency path computation unit 71 is unable to compute an emergency path based on the entire common path portion XTj, since it detects a conflict or anomaly in the common path portion XTj.

The emergency path computation unit 71 will compute an emergency path, called avoidance path Se, by reducing the common path portion XTj to a part thereof until the conflict disappears and until an emergency path towards the diversion airport DIV ARPT is found. The common path portion cannot be reduced below a flight time (of the order of 30 seconds in view of the current state of the aircraft) compatible with an ultimate maneuver for avoiding the conflict that is implemented by the aircraft A.

In a warning step E30 implemented by the emergency path computation unit 71 following the step E20 of computing the emergency path, the emergency path computation unit 71 sends a signal S_avert3 to a screen D of the cockpit P in order to display a warning message intended for the pilot notifying them of the conflict and requesting action, within a predetermined time (maximum of four minutes thirty seconds considering a common path portion XTj of five minutes and a computation iteration of thirty seconds for the emergency guidance chain 70), on a control G (for example: modification of the heading) in order to resolve the conflict.

In a monitoring step E31 implemented by the emergency path computation unit 71 following the warning step E30, the emergency path computation unit 71 verifies that the pilot has reacted during the predetermined time by activating a control G in order to resolve the conflict. A signal (not shown) is sent by the emergency path computation unit 71 to the selection unit 80 that contains information relating to the monitoring of the response of the pilot to the request from the emergency path computation unit 71 within the predetermined time.

At the same time as the monitoring step E31 runs, the avoidance path Se computed by the emergency path computation unit 71 during the step E20 of computing the emergency path is transmitted to the emergency path monitoring unit 72. This unit, in a step E32 of validating the avoidance path, verifies the validity of the avoidance path computed by the emergency path computation unit 71.

What happens after the step E32 of validating the avoidance path for the avoidance path Se is identical to that which is described above with respect to FIG. 5 after the step E21 of validating the emergency path for the emergency path Sj.

The computation of the avoidance path Se is continuously updated for the predetermined time in order to take into account the evolution of the state of the aircraft.

The backup unit 73 continuously verifies the validity of the backed-up path SAUV and sends a signal S_valid to the switching unit 80 to indicate the validity of the recorded path SAUV.

At the end of the predetermined time:

if the pilot has reacted within the predetermined time, the pilot can act on the aircraft A to avoid the conflict and, during the next iterations, the emergency path computation unit 71 will be able to compute an emergency path Sj based on the entire common portion XTj;

if the pilot has not reacted within the predetermined time, in a step E33 of transmitting guidance instructions, the selection unit 80 activates the flight controller 50 if it has been deactivated and transmits the emergency guidance instructions CONS2 to the flight controller 50 that are computed by the emergency guidance unit 74 and are validated by the emergency guidance monitoring unit 75 and are based on the path SAUV recorded in the backup unit 73 and computed in the previous iteration (if it is the avoidance path Se), since the lack of a response indicates that the crew is unable to quickly respond to the imminent conflict.

It should be noted that, during the predetermined time, in the event that the backup unit 73, during an iteration, anticipates the invalidity of the backed-up path SAUV for the following iteration, the signal S_valid is modified to include the information indicating that the path is invalid. For example, the backup unit anticipates the invalidity of the backed-up path SAUV in the next iteration when the backed-up path will have expired in the next iteration, since the number of iterations during which no avoidance path Se has been computed will have been too high (expiry from 9 unsuccessful iterations of 30 seconds when the common path portion XTj is five minutes).

Upon receipt of the signal S_valid mentioning that the backed-up path SAUV is invalid, a backup solution of the aircraft A is implemented so that the aircraft A can reach a diversion airport DIV ARPT in safe conditions. A backup solution involves, for example, activating, by the selection unit 80, the flight controller 50 and transmitting emergency guidance instructions CONS2 thereto that are associated with the backed-up path SAUV.

C/ The case whereby the emergency path computation unit 71 is completely unable to compute an emergency path (case not shown in the figures).

The path SAUV recorded during a previous iteration and the associated emergency guidance instructions CONS2, developed in the current iteration based on the backed-up path SAUV, are those provided by the emergency guidance chain 70 until the next iteration. The switching unit 80 will accept these instructions CONS2 if the signal S_valid contains information indicating that the path SAUV is valid.

In the case whereby the signal S_valid contains information indicating that the path SAUV is invalid, the switching unit 80 does not accept the instructions CONS2 and sends a signal S_req to the emergency path computation unit 71 for relaunching the computation of an emergency path with another diversion solution (for example: a different diversion airport).

The guidance architecture 40 according to the disclosure herein allows, in the event that the crew is unable to fly the aircraft A, the aircraft A to be guided onto an emergency path towards a diversion airport, while guaranteeing the availability and the integrity of the guidance of the aircraft A on the emergency path, since the software implemented by the emergency guidance chain is reliable in terms of anomalies. The implementation of autonomous landing, which does not form part of the disclosure herein, will allow the aircraft A to land at the diversion airport.

The guidance architecture 40 according to the disclosure herein is particularly suitable for the operations of an aircraft intended to be flown by a single pilot.

As a secondary advantage, the guidance architecture 40 according to the disclosure herein allows the pilots to be warned in the event of the detection of an anomaly on the main guidance chain 60, so that the pilots can detect and correct an anomaly more quickly.

It should be noted that in a case whereby the pilot, after having been incapacitated, is again able to resume control of the aircraft A and to follow the flight plan Pln of the aircraft, the pilot can activate the flight controller 50 and act on the selection unit 80 via the controls G in order to force the selection unit 80 to transmit, to the flight controller 50, the main guidance instructions CONS1 from the main guidance chain 60 instead of the emergency guidance instructions CONS2 from the emergency guidance chain 70.

In a similar vein, a ground-based operator acting on the systems of the aircraft A via the communication device 10 thereof can also act on the selection unit 80 in order to force the unit to transmit, to the flight controller 50, the main guidance instructions CONS1 from the main guidance chain 60 instead of the emergency guidance instructions CONS2 from the emergency guidance chain 70. The ground-based operator can enter a new flight plan, which will be used by the main guidance chain 60, instead of the initial flight plan Pln for editing main guidance instructions CONS1 that will be implemented by the flight controller 50.

With reference to FIGS. 7 through 10, an example of the operation of the guidance architecture 40 according to the disclosure herein will be described. In these figures, the flight plan Pln of the aircraft A is schematically shown by dashed line segments, joined at points of passage in the form of diamonds. The final point of passage of the flight plan is the destination airport DEST ARPT. In the example, the destination airport DEST ARPT is also the diversion airport DIV ARPT considered by the emergency guidance chain 70.

Figure 7:
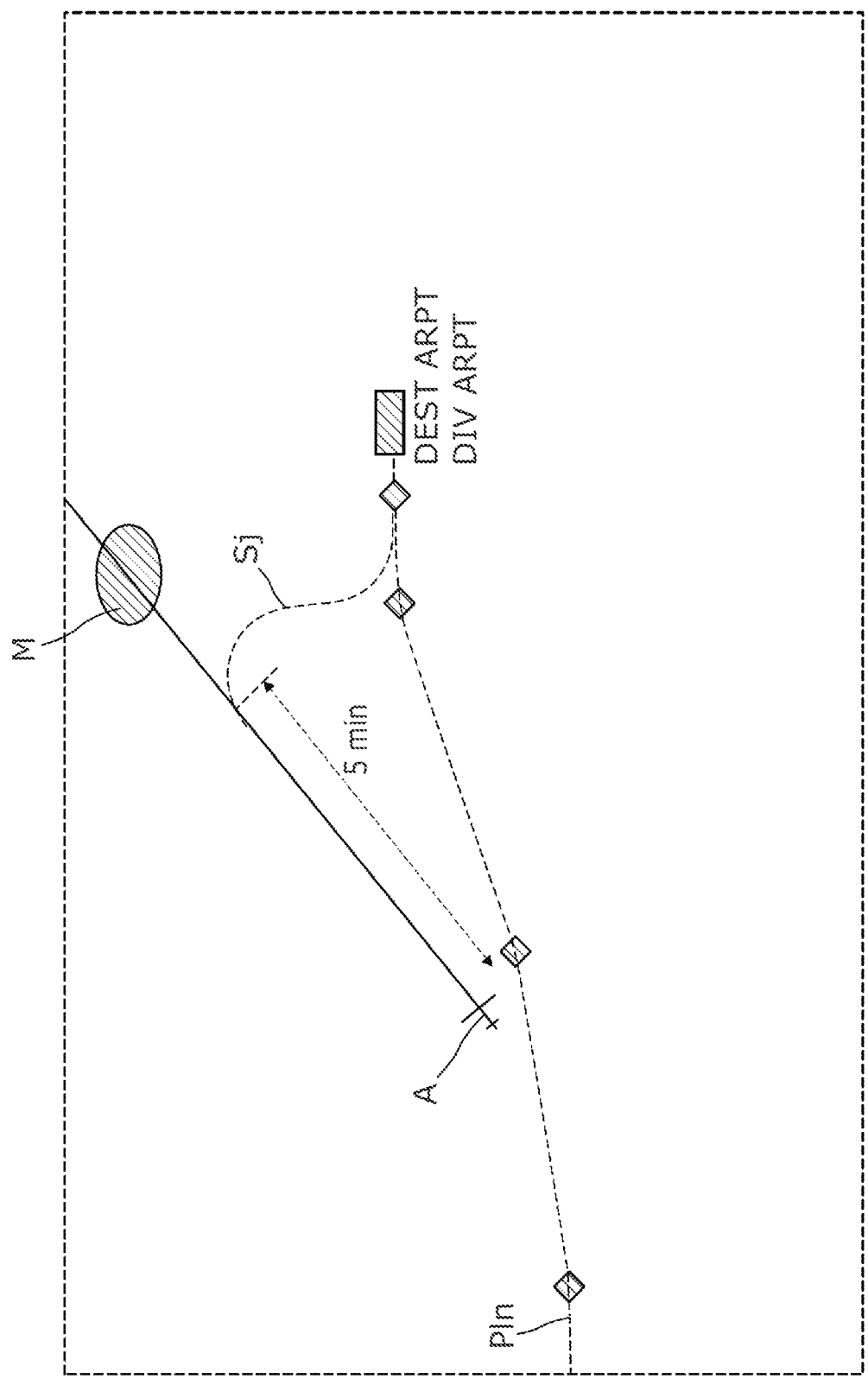
FIG. 7 is a schematic view of the navigation of an aircraft and of paths computed by the guidance architecture shown in FIG. 2 in a first situation.
Figure 8:
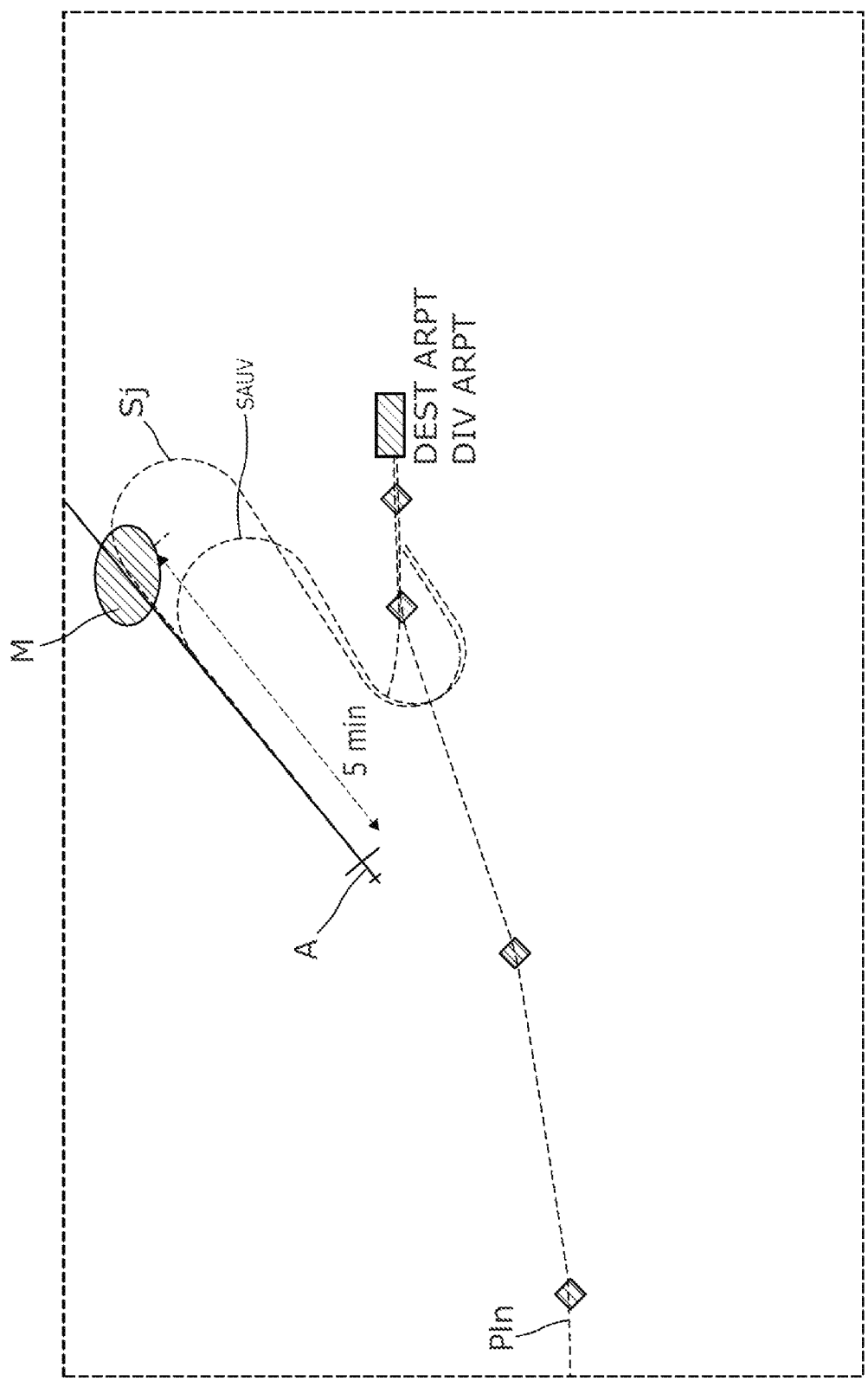
FIG. 8 is a view similar to FIG. 7, in a second situation following the first situation illustrated in FIG. 7.
Figure 9:
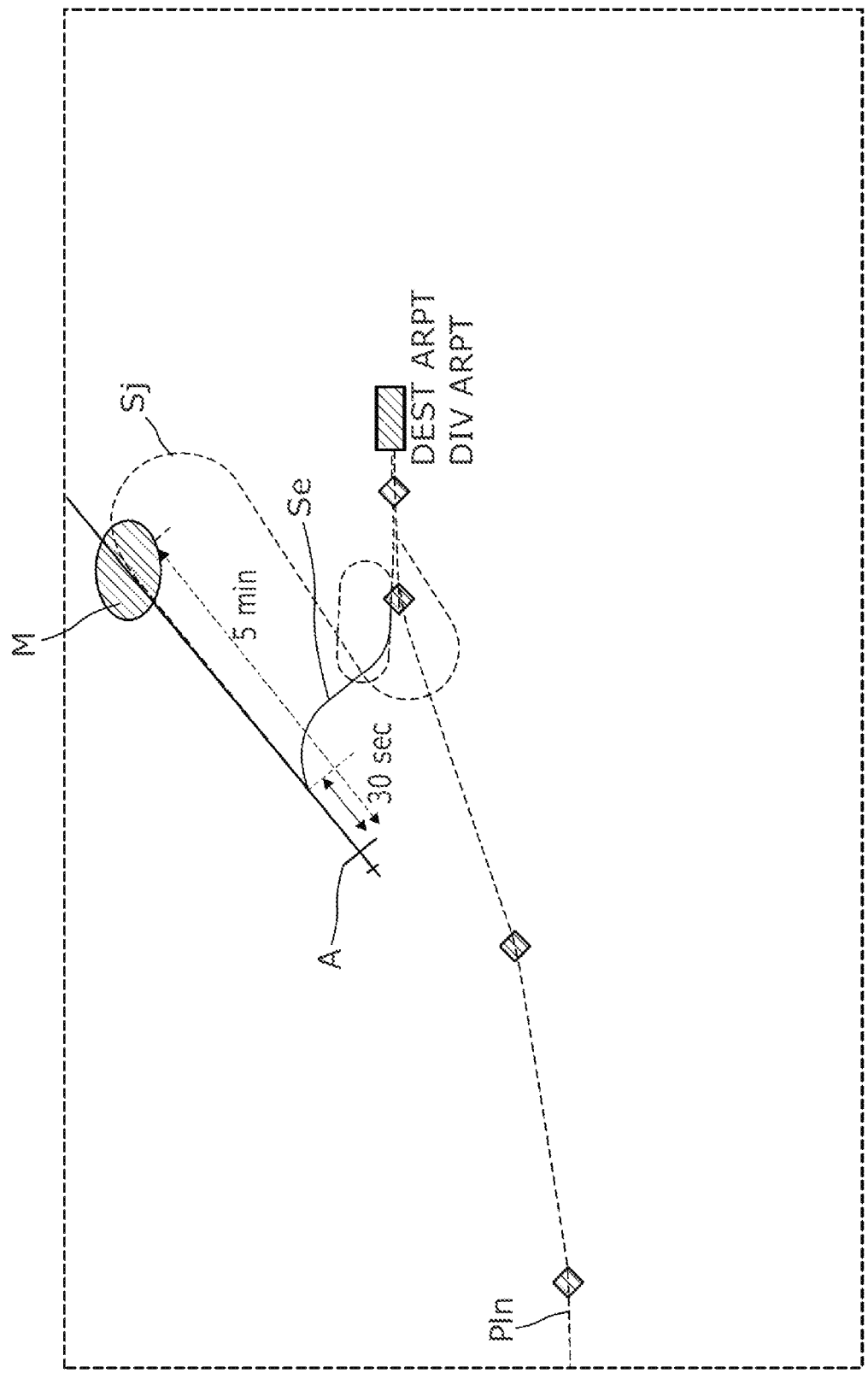
FIG. 9 is a view similar to FIG. 7, in a third situation following the second situation illustrated in FIG. 8.
Figure 10:
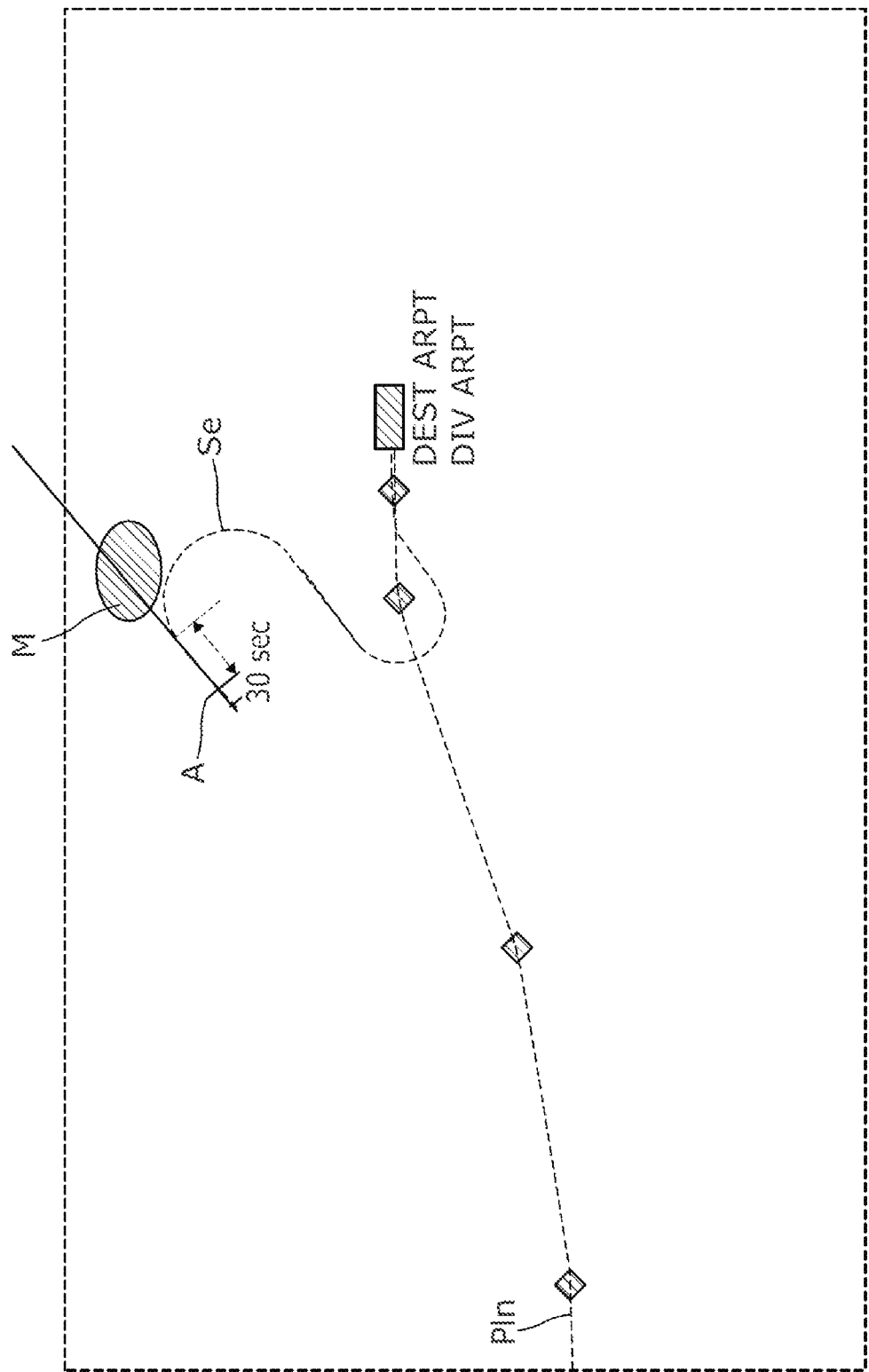
FIG. 10 is a view similar to FIG. 7, in a fourth situation following the third situation illustrated in FIG. 9.

The aircraft A is near the destination airport DEST ARPT scheduled on the flight plan and has moved away, following the action of the pilot, from the flight plan Pln following instructions from the air traffic controller (ATC) in order to avoid the air traffic. The aircraft A flies in a straight line, along a current vector, pending further instructions from air traffic control. A relief M is located in front of the aircraft, several flight minutes away (FIG. 7).

The main guidance unit 60 continuously computes a main path Tj (not shown) for re-joining the flight plan Pln, if the pilot would like to activate the flight controller 50 to fly the aircraft A autonomously.

Every thirty seconds the emergency guidance chain 60 computes an emergency path Sj for reaching the diversion airport DIV ARPT and this path Sj is backed-up. The emergency path Sj has a common portion with the current vector (in this case five minutes).

In a first iteration (FIG. 7), the emergency guidance chain computes an emergency path Sj that is valid and this valid emergency path Sj is recorded in the backup unit 73 of the active flight management system of the emergency guidance chain 70.

In a second iteration (FIG. 8), the emergency guidance chain 70 has computed an emergency path Sj, but the path is invalid, since it exhibits a conflict with the relief M in the common portion (five minutes).

With the emergency path Sj being invalid, it is the emergency path SAUV backed-up in the backup unit 73 that is considered by the selection unit 80.

The emergency path computation unit 71 then computes an avoidance path Se by limiting the common portion to a flight time of thirty seconds (30 sec in FIG. 9) to avoid the conflict with the relief A warning message is displayed on a display screen D of the cockpit P that is intended for the pilot to notify them of the conflict and requesting action, within a predetermined time (time less than four minutes thirty seconds), on a control G (change of heading, for example) in order to resolve the conflict. It should be noted that, during the predetermined time, the avoidance path Se is updated for each computation cycle (iteration) of thirty seconds.

In the example, the pilot does not react to the warning message within the predetermined time. In a subsequent iteration (FIG. 10), the flight controller 50 is activated and applies the emergency guidance instructions CONS2 of the emergency guidance unit 70. The emergency guidance instructions CONS2 are based on the last path SAUV recorded in the backup unit 73, i.e. the updated avoidance path Se. The avoidance path Se allows the aircraft, equipped with autonomous landing, to avoid the conflict with the terrain and to land at the diversion airport DIV AR PT.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a cockpit with display screens and controls that can be activated by a pilot,
   a communication device for communicating with a ground-based operator,
   a unit for measuring physical ability or inability configured to determine whether the pilot is able or unable to fly the aircraft and to transmit a signal comprising information relating to the ability or inability of the pilot to fly the aircraft,
   a database including coordinates of a plurality of airports,
   guidance avionics comprising a guidance architecture configured to compute guidance instructions for the aircraft and
   a flight controller that can be activated/deactivated via an action of the pilot on the controls and is configured to fly the aircraft according to the guidance instructions,
   wherein the guidance architecture comprises two dissimilar guidance chains and a selection unit connected to the two guidance chains, to the flight controller, to the controls, to the display screens and to the unit for measuring physical ability or inability for receiving the signal transmitted by the unit,
   wherein the two dissimilar guidance chains comprise:
      a first guidance chain, or main guidance chain, configured to:
         compute a main path for the aircraft towards a destination airport based on a current state of the aircraft, on first weather data, and on a flight plan prepared before a flight of the aircraft;
         compute main guidance instructions for the aircraft for following the main path by computing curvilinear transitions among legs of the first flight plan that are adapted to flight conditions of the aircraft, and
         transmit the main guidance instructions to the selection unit;
      a second guidance chain, or emergency guidance chain, configured to:
         identify a diversion airport that is closest to the aircraft among the plurality of airports in the database;
         compute an emergency path for the aircraft that is independent from the flight plan towards the diversion airport based on at least one part of an initial portion of a common path with the main path, on second weather data that is simplified relative to the first weather data, and on the current state of the aircraft;
         compute emergency guidance instructions for the aircraft for following the emergency path by computing the emergency path using only straight geometrical segments and/or arcs of circles; and
         transmit the emergency guidance instructions to the selection unit;
   wherein, at a same time that the main guidance instructions are computed by the first guidance chain, the second guidance chain is configured to repeatedly identify the diversion airport, compute the emergency path, compute the emergency guidance instructions, and transmit the emergency guidance instructions to the selection unit at intervals during the flight of the aircraft such that the emergency guidance instructions transmitted to the selection unit correspond to a most recent computation of the emergency path; and
   wherein the selection unit is configured to concurrently receive both of the main guidance instructions and the emergency guidance instructions and to transmit one of the main guidance instructions or the emergency guidance instructions to the flight controller as a function of the information relating to the ability or inability of the pilot to fly the aircraft.

2. The aircraft of claim 1, wherein the selection unit is configured to transmit the emergency guidance instructions to the flight controller upon receipt of a signal comprising information relating to the inability of the pilot to fly the aircraft.

3. The aircraft of claim 2, wherein the selection unit is configured to transmit the emergency guidance instructions to the flight controller upon receipt of a signal transmitted by the main guidance chain and indicating that the main guidance chain is faulty.

4. A method for guiding an aircraft comprising a cockpit with display screens and controls that can be activated by a pilot, a communication device for communicating with a ground-based operator, a unit for measuring physical ability or inability configured to determine whether the pilot is able or unable to fly the aircraft and to transmit a signal comprising information relating to the ability or inability of the pilot to fly the aircraft, the aircraft comprising a database including coordinates of a plurality of airports, guidance avionics comprising a guidance architecture configured to compute guidance instructions for the aircraft, and a flight controller that can be activated/deactivated via an action of the pilot on the controls and is configured to fly the aircraft according to the guidance instructions, the guidance architecture comprising two dissimilar guidance chains and a selection unit connected to the two guidance chains, to the flight controller, to the controls, to the display screens and to the unit for measuring physical ability or inability for receiving the signal transmitted by the unit, the method comprising:
   computing, by a main guidance chain of the two guidance chains, a main path for the aircraft towards a destination airport based on a current state of the aircraft, on first weather data, and on a first flight plan prepared before a flight of the aircraft;
   computing main guidance instructions based on the main path by computing curvilinear transitions among legs of the first flight plan that are adapted to flight conditions of the aircraft;
   identifying a diversion airport that is closest to the aircraft among the plurality of airports in the database;

computing, by an emergency guidance chain of the two guidance chains, an emergency path for the aircraft that is independent from the flight plan towards the diversion airport based on at least one part of an initial portion of a common path with the main path, on second weather data that is simplified relative to the first weather data, and on the current state of the aircraft;

computing emergency guidance instructions for the aircraft based on the emergency path by computing the emergency path using only straight geometrical segments and/or arcs of circles;

transmitting both of the main guidance instructions and the emergency guidance instructions to the selection unit; and selectively transmitting one of the main guidance instructions or the emergency guidance instructions to the flight controller, wherein the selection unit transmits the main guidance instructions to the flight controller if the signal transmitted by the unit for measuring physical ability or inability comprises information relating to the ability of the pilot to fly the aircraft, and wherein the selection unit transmits the emergency guidance instructions to the flight controller if the signal comprises information relating to the inability of the pilot to fly the aircraft and activates the flight controller if the controller is deactivated;

wherein, at a same time that the main guidance instructions are computed by the first guidance chain, steps of identifying the diversion airport, computing the emergency path, computing the emergency guidance instructions, and transmitting the emergency guidance instructions to the selection unit are repeated at intervals during the flight of the aircraft such that the emergency guidance instructions transmitted to the selection unit correspond to a most recent computation of the emergency path.

5. The method of claim 4, wherein the selection unit transmits the emergency guidance instructions to the flight controller upon receipt of a signal transmitted by the main guidance chain and indicating that the main guidance chain is faulty, and activates the flight controller if the controller is deactivated.

6. The method of claim 4, wherein, in a warning step implemented by the emergency guidance chain following the step of computing the emergency path in an event that the emergency guidance chain has computed an emergency path only on one part of the initial portion of the common path, the emergency guidance chain sends a signal to a screen of the cockpit to display a warning message for a pilot asking the pilot to act on the controls within a predetermined time, and, only if the pilot has not reacted during the predetermined time, in a step of transmitting guidance instructions, the selection unit transmits the emergency guidance instructions from the emergency guidance chain to the flight controller and activates the flight controller if the controller is deactivated.

* * * * *